Figure 1:
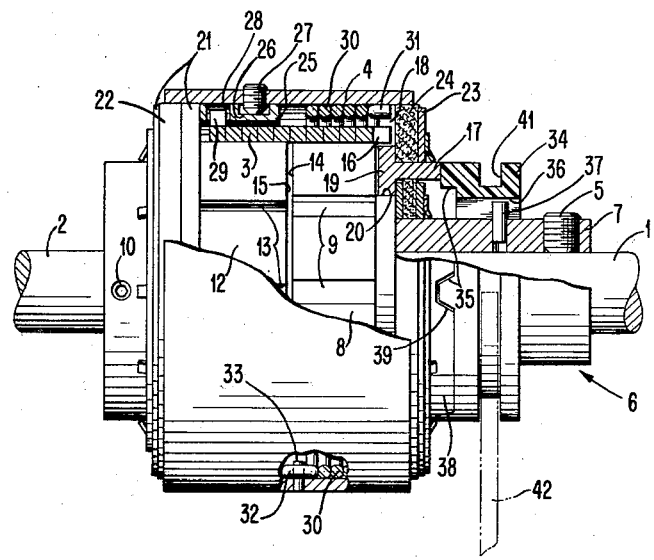

July 27, 1965 L. M. COOPER 3,197,002
TWO TORQUE CLUTCH
Filed Sept. 14, 1962 2 Sheets-Sheet 1

INVENTOR.
LEON M. COOPER
BY *D. Kendall Cooper*
ATTORNEY.

July 27, 1965   L. M. COOPER   3,197,002
TWO TORQUE CLUTCH
Filed Sept. 14, 1962   2 Sheets-Sheet 2

United States Patent Office 3,197,002
Patented July 27, 1965

3,197,002
TWO TORQUE CLUTCH
Leon M. Cooper, Lexington, Ky., assignor to International Business Machines Corporation, New York, N.Y., a corporation of New York
Filed Sept. 14, 1962, Ser. No. 223,657
8 Claims. (Cl. 192—81)

This invention relates to clutch mechanisms, and more particularly to a spring clutch mechanism having either of two levels of torque during operation.

Clutches having two torque capabilities are assuming increased importance in a wide variety of devices where speed changes are necessary, but where it is desirable to effect the changes under continuously running conditions. An exemplary device where a clutch of this type has particular utility, is the "Tape Handling Mechanism" described in U.S. application Serial No. 165,387, filed January 10, 1962, now Patent 3,153,516, with R. M. De Loof and L. M. Cooper as inventors.

In the aforementioned De Loof et al. patent, apparatus is provided for loading and feeding magnetic tape cartridges, with the tape being made almost instantly available for processing as soon as it is loaded on a tape transport spindle. The De Loof et al. apparatus is designed throughout for expeditious and rapid operation. Tape from an inserted cartridge is threaded through a plurality of stations under control of a single permanently installed leader which coacts with any inserted tape.

Among the advantages of the De Loof apparatus is the provision of mechanism for preventing the tendency of tape to festoon during the process of feeding. A continuous light torque is applied for this purpose to a tape reel mounting shaft in the apparatus which tends to turn an inserted tape reel in a direction to wind tape onto it thereby maintaining a desired tautness even after an initial securing means has been removed. However, in order to effect rapid rewind, a higher torque is applied to the tape reel mounting shaft. A unitary clutch mechanism is shown in the De Loof apparatus for furnishing the two torques required, said clutch being fully described in U.S. Patent 3,104,745, W. J. Wipke, entitled "Two Torque Spring Slip Clutch." The present two torque clutch which is based on new and novel arrangements, will also fulfill the requirements of the De Loof apparatus in an effective manner.

An object of the invention is to provide a clutch mechanism which supplies two levels of torque transmission between a driving member and a driven member under continuous drive conditions.

Another object of the present invention is to provide a two-torque clutch mechanism of simplified design.

In accordance with a preferred embodiment of the invention, a clutch mechanism is provided which has means for establishing either of two torque transmission levels in a selective manner through a single primary coupling element.

Figure 2:
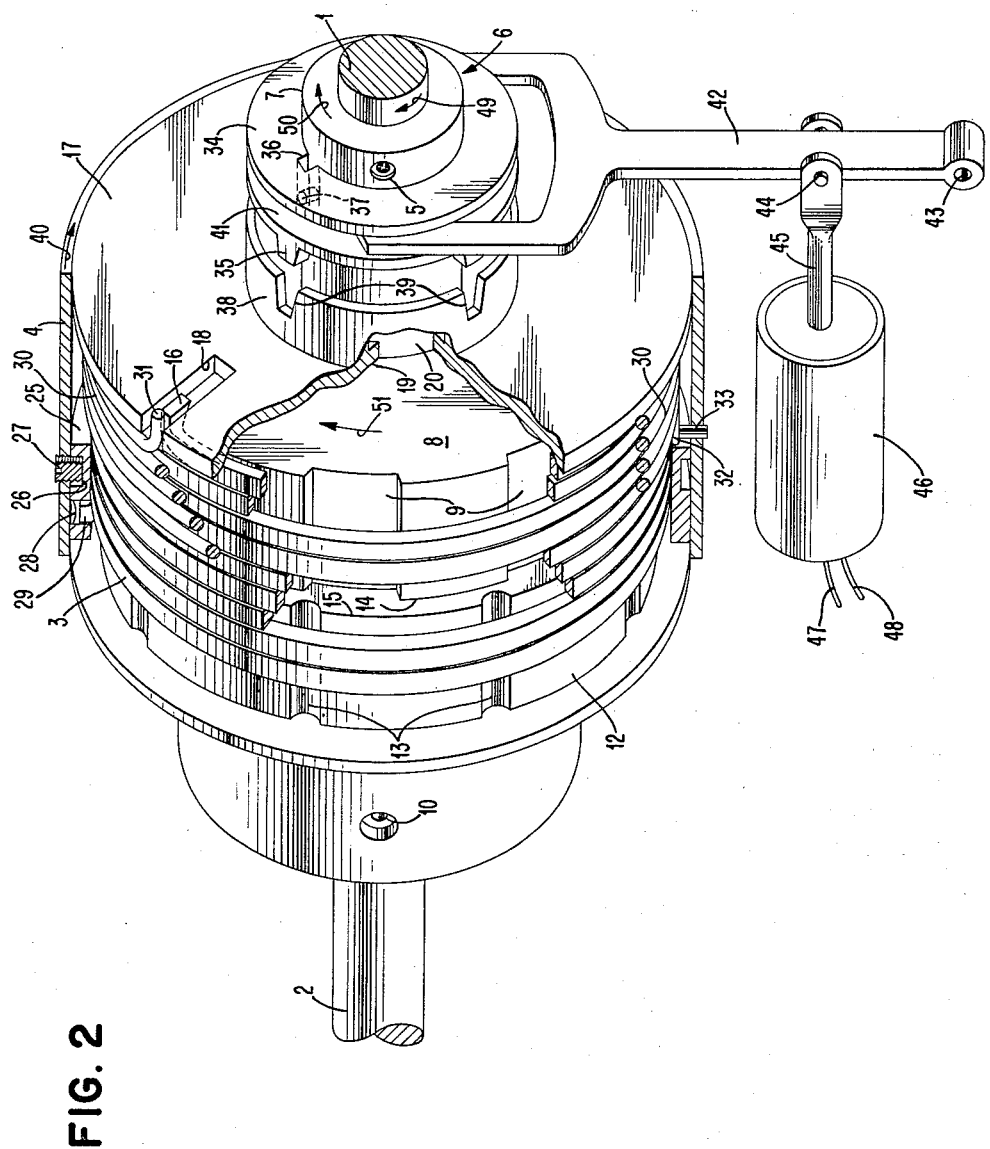

The foregoing and other objects, features and advantages of the invention will be apparent from the following more particular description of the preferred embodiment of the invention as illustrated in the accompanying drawings:

In the drawings:
FIGURE 1 is a partial cross-sectional view of a clutch mechanism according to the invention.
FIGURE 2 is cross-sectional perspective view of the clutch mechanism of FIGURE 1.

*Description*

The clutch mechanism of FIGURES 1 and 2 transmits power from a drive shaft 1 to a driven shaft 2 at either of two torque levels by selective control of a helical spring coupling element 3.

The clutch comprises a number of elements that are assembled in a generally concentric fashion with respect to the shafts 1 and 2, and also with respect to a cylindrical sleeve member 4.

Attached to the drive shaft 1 by means of a set screw 5 is an arbor 6 which has an elongated bushing portion 7 surrounding the shaft 1 and an enlarged cylindrical portion 8 which has a number of slots 9 that are spaced about its periphery. Attached to the driven shaft 2 by means of a set screw 10 is an arbor 12, which has a number of slots 13. When assembled in operating position, the arbor portion 8 and the arbor 12 are arranged to face each other within the clutch mechanism, but a predetermined distance apart so that the respective facing surfaces 14 and 15 lie in parallel planes but do not touch.

Concentrically mounted in a freely movable but closely fit arrangement with respect to the portion 8 of arbor 6, is an auxiliary annular force transmitting member 17 which has a radial slot 18 that accommodates an ear 16 extending from the coupling spring 3. Member 17 has a circular flange 19 which engages a complementary circular shoulder 20 on the arbor 6.

Referring to FIGURE 1, grease seal retaining washers 21 and a grease seal 22 are mounted on a circular shoulder of arbor 10. Also, in FIGURE 1, a grease seal retaining washer 23 and grease seal 24 are mounted adjacent the surface of member 17. The elements 21–24 are not shown in FIGURE 2 for reasons of clarity.

Positioned internally of the sleeve member 4 is a spring retaining collar 25 which has an annular groove 26. The groove 26 accommodates a set screw 27 which is retained in a threaded aperture of the sleeve 4. The collar 25 also has an aperture 28 which receives an ear 29 of the helical spring 3.

Also positioned internally of the sleeve member 4 and around the right hand portion of the helical spring 3 is a clutch booster spring 30. The clutch booster spring 30 has an ear 31 which engages the slot 18 in arbor 17 and an ear 32 which engages a stud 33 that projects inside the sleeve 4.

The spring 30, collar 25 and sleeve 4, together with set screw 27 are provided in order to permit adjustment of clutch tension.

Slidably mounted on the bushing portion 7 of arbor 6 is a hub or shipper ring 34 which has a number of protuberances spaced 90° apart, such as protuberance 35. The ring 34 has an internally located channel 36 which engages a stud 37 that projects from the portion 7 of arbor 6. This arrangement permits the ring 34 to be moved axially along the bushing portion 7 of arbor 6 within limits imposed by the length of channel 36 but insures a fixed angular relationship between the ring 34 and portion 7 of arbor 6, as well as the drive shaft 1.

The ring 34 has an annular groove 41 which accommodates a yoke 42. Yoke 42 is pivotally mounted at 43 and pivotally attached at 44 to a plunger 45 which is moved under control of a solenoid 46. Movement of ring 34 is thereby accomplished by appropriate energization of solenoid 46 through wires 47 and 48 under control of contacts and elements, which are not shown, but which would be similar to those found in the aforementioned De Loof et al. application.

Included in a shoulder 38 of the member 17 are four recesses spaced 90° apart which are adapted to receive the protuberances 35. This provides a positive engagement between ring 34 and member 17 when ring 34 is moved toward member 17 along the portion 7 of arbor 6. The ring 34 and member 17 serve as an auxiliary force transmitting clutch means with respect to the main clutch assembly.

It will be understood that various dimensional relationships can be established among the elements of the clutch. However, for purposes of illustration, some dimensions of a few of the clutch elements that were found suitable in an actual mechanism are presented below:

Sleeve 4—Internal diameter 1.4375 inches
Collar 25—External diameter 1.435 inches, internal diameter 1.296 inches
Helical spring 3—9½ turns, right hand, close wound, internal diameter 1.105 inches (fully contracted)
Helical spring 30—5½ turns, right hand, internal diameter 1.359 inches
Collar 12—External diameter 1.125 inches
Cylindrical portion 8 of arbor 6—External diameter 1.115 inches When the helical spring 3 is mounted over the arbor 12 and cylindrical portion 8 of arbor 6, spring 3 expands slightly from the fully contracted dimension shown above and is thereby frictionally engaged with both arbor 12 and portion 8.

It will be noted in the illustrative dimensions, that the external diameter of the arbor 12 is slightly greater than the external diameter of the cylindrical portion 8 (1.125 inches vs. 1.115 inches). Therefore, a greater interference or frictional engagement exists between helical spring 3 and arbor 12 than between spring 3 and portion 8 of arbor 6. The degree of frictional engagement between spring 3 and the arbor members 6 and 12 is adjusted in the following manner. The set screw 27 is loosened, so that the sleeve 4 turns freely with respect to the collar 25. If sleeve 4 is then rotated manually in a clockwise direction, as indicated by arrow 40, FIGURE 2, and set screw 27 tightened, force is applied through stud 33, spring 30, and member 17 which causes spring 3 to contract around arbor 12 and cylindrical portion 8 of arbor 6. This results in greater frictional engagement between spring 3 and the arbor members 6 and 12. Sleeve 4 can be rotated in the opposite direction to reduce the frictional engagement.

However, the friction between spring 3 and portion 8 is always at a lower level than between spring 3 and arbor 12 due to the difference in interference moments.

*Operation*

It will be assumed that prior to initiation of operations, the adjustment of helical spring 3 under control of spring 30 has been set as described above in order to obtain a suitable frictional engagement between spring 3 and the arbor members 6 and 12. With the ring 34 separated from the shoulder 38 of member 17, as shown in FIGURE 2, a low torque mode of operation is established in the clutch mechanism and power is transmitted as follows:

Drive shaft 1 rotates clockwise, and since arbor 6 is attached to drive shaft 1 by means of set screw 5, arbor 6 also rotates clockwise, as indicated by arrows 49, 50 and 51, FIGURE 2. Rotation or arbor 6 (portion 8) in the direction indicated results in a tightening of spring 3.

Transmission of foroce at a low torque level from shaft 1 to shaft 2 occurs by virtue of the frictional engagement between portion 8 of arbor 6 and spring 3, as well as the frictional engagement between spring 3, and arbor 12. The torque level in this case is determined by the frictional engagement between spring 3 and portion 8 of arbor 6.

If a high torque mode of operation is required, as described in the De Loof et al., application, solenoid 46 is energized and draws yoke 42 to the left. The movement of yoke 42 to the left forces ring 34 to the left so that its protuberances, such as protuberance 35, engage recesses 39 in shoulder 38 of member 17. The clutch mechanism will then appear as shown in FIGURE 1.

Engagement of ring 34 with member 17 in this manner, changes the driving relationship of the clutch so that drive occurs from drive shaft 1, arbor 6, stud 37 and recess 36 in ring 34, protuberances 35 and recesses 39 of member 17 and slot 18 of member 17 to ear 16 of spring 3. Arbor 12 is still driven by frictional engagement with spring 3 and in turn drives shaft 2.

The energization of solenoid 46 results in a direct drive being established between shaft 1 and the right portion of spring 3, through the auxiliary force transmitting elements 34 and 17. A torque level is thereby established which is higher than the torque level which exists when the right portion of spring 3 is driven only through its frictional contact with cylindrical portion 8 of arbor 6. In the high torque mode the clutch torque is determined only by the frictional contact between arbor 12 and spring 3.

The embodiment of the invention shown in FIGURES 1 and 2 is the preferred embodiment, but various changes may be made thereto, according to the requirements of the user.

For example, it may be expedient to place an auxiliary control mechanism including elements comparable to member 17 and ring 34 and solenoid 46 on the driven side of the clutch rather than on the drive side as shown. If this were done, the diametrical relationship between the arbors would be reversed so that cylindrical portion 8 of arbor 6 would have a larger external diameter than arbor 12. In addition, the extremities 16 and 29 of helical spring 3 would also be reversed.

This would permit selection of two torque levels in a manner similar to that previously described. In this case, in the low torque mode, the torque level would be determined by the frictional engagement between spring 3 and arbor 12. In the high torque mode, the torque level would be determined by the frictional engagement between spring 3 and portion 8 of the arbor 6.

From the foregoing description, it is apparent that a novel clutch mechanism has been provided which is operable in either of two torque modes in an efficient manner and with a minimum number of working elements.

While the invention has been particularly shown and described with reference to a preferred embodiment thereof, it will be understood by those skilled in the art that additional changes in form and details other than those just described may be made therein without departing from the spirit and scope of the invention.

What is claimed is:
1. A clutch mechanism, comprising:
 a coupling spring;
 a driving member, said member being positioned in frictional engagement with said spring;
 a driven member, said member being positioned in frictional engagement with said spring;
 means for rotating said driving member to thereby effect rotation of said driven member through said spring at a particular torque level;
 auxiliary means, said auxiliary means assuming either an inactive free running relationship or an active force transmitting relationship with respect to said spring;
 and selectively operable engaging means for directly coupling said auxiliary means between one of said members and said spring so that a direct drive is established between said one member and said spring, and a torque level is thereby established which is different from said particular torque level.
2. A clutch mechanism, comprising:
 a coupling spring;
 a driving member, said driving member being positioned within said spring in frictional engagement therewith;
 a driven member, said driven member being positioned within said spring in frictional engagement therewith and in opposed relationship with respect to said driving member;
 means for rotating said driving member to thereby effect rotation of said driven member through said spring at a low first torque level that is established by the frictional engagement between said members and said spring;

auxiliary means, said auxiliary means comprising a force transmitting mechanism having a first portion normally engaged with said spring and mounted for rotation with said spring, and said mechanism further comprising a second portion normally engaged with one of said members and mounted for rotation with said one member;

and selectively operable engaging means for directly coupling the force transmitting portions of said auxiliary means so that a direct drive is established to said spring and thereby to said driven member with a torque level that is higher than said first torque level.

3. A clutch mechanism, comprising:
a helical coupling spring;
a cylindrical driving member, said driving member being positioned within said spring in frictional engagement therewith;
a cylindrical driven member, said driven member being positioned within said spring in frictional engagement therewith and in opposed relationship with respect to said driving member, said driven member having an external diameter that is different from the external diameter of said driving member;
means for rotating said driving member to thereby effect rotation of said driven member through said coupling spring at a low first torque level that is established by the frictional engagement between said spring and the one of said members having the smaller external diameter;
an auxiliary force transmitting member, said auxiliary member being normally engaged with said coupling spring and mounted for rotation with said spring;
and selectively operable engaging means for directly coupling said auxiliary member to said rotating means so that a direct drive is established to said spring and thereby to said driven member at a torque level that is higher than said first torque level.

4. A clutch mechanism, comprising:
a helical coupling spring;
a cylindrical driving member, said driving member being positioned within said spring in frictional engagement therewith;
a cylindrical driven member, said driven member being positioned within said spring in frictional engagement therewith and in opposed relationship with respect to said driving member, said driven member having an external diameter that it different from the external diameter of said driving member;
adjusting means for establishing a predetermined degree of frictional engagement between said driving member and said spring, and between said driven member and said spring;
means for rotating said driving member to thereby effect rotation of said driven member through said coupling spring at a low first torque level that is established by the frictional engagement between said spring and the one of said members having the smaller external diameter;
auxiliary force transmitting means, said auxiliary means being normally engaged with said coupling spring and mounted for rotation with said spring;
and selectively operable engaging means for directly coupling said auxiliary means to said rotating means so that a direct drive is established to said spring and thereby to said driven member with a torque level that is higher than said first torque level.

5. A clutch mechanism for coupling a drive shaft to a driven shaft, comprising:
a helical coupling spring;
a first cylindrical member affixed to said drive shaft, said first member being positioned within said spring in frictional engagement therewith;
a second cylindrical member affixed to said driven shaft, said second member being positioned within said spring in frictional engagement therewith and in opposed relationship with respect to said first member, and said second member being spaced a predetermined distance apart from said first member;
means for rotating said drive shaft to thereby effect rotation of said driven shaft through said coupling spring at a particular torque level that is established by the frictional engagement between said members and said spring;
auxiliary clutch means, said auxiliary clutch means comprising a driven portion that is normally engaged with said spring and mounted for rotation with said spring, and said auxiliary clutch means further comprising a driving portion that is normally engaged with said rotating means for rotation with said rotating means;
and selectively operable engaging means for directly coupling the said portions of said auxiliary clutch means so that a direct drive is established to said spring and thereby to said second cylindrical member with a torque level that is different from said particular torque level.

6. A clutch mechanism, comprising:
a helical coupling spring, said spring being formed with an ear extending from at least one extremity;
a cylindrical driving member, said driving member being positioned within the portion of said spring from which said ear extends and in frictional engagement with said spring;
a cylindrical driven member, said driven member being positioned within said spring in frictional engagement therewith and in opposed relationship with respect to said driving member, and said driven member being spaced a predetermined distance apart from said driving member;
means for rotating said driving member to thereby effect rotation of said driven member through said coupling spring at a particular torque level that is established by the frictional engagement between said members and said spring;
an auxiliary force transmitting member, said member being normally engaged with the ear on said coupling spring and mounted for rotation with said spring,
and selectively operable engaging means for directly coupling said auxiliary member to said rotating means so that a direct drive is established to said spring and thereby to said cylindrical driven member with a torque level that is different from said particular torque level.

7. A clutch mechanism, comprising:
a helical coupling spring, said spring being formed with an ear extending from at least one extremity;
a cylindrical driving member, said driving member being positioned within the portion of said spring from which said ear extends and in frictional engagement with said spring;
a cylindrical driven member, said driven member being positioned within said spring in frictional engagement therewith and in opposed relationship with respect to said driving member, and said driven member being spaced a predetermined distance apart from said driving member;
means for rotating said driving member to thereby effect rotation of said driven member through said coupling spring at a particular torque level that is established by the frictional engagement between said members and said spring;
an annular member, said annular member having a radially extending slot that is engaged with the ear on said coupling spring and said annular member being mounted for rotation with said coupling spring;

and selectively operable engaging means for directly coupling said annular member to said rotating means so that a direct drive is established to said spring and thereby to said driven member.

8. A clutch mechanism, comprising:

a helical coupling spring, said spring being formed with an ear extending from at least one extremity;

a cylindrical driving member, said member being positioned within the portion of said spring from which said ear extends in frictional engagement with said spring;

a cylindrical driven member, said member being positioned within said spring in frictional engagement therewith and and in opposed relationship with respect to said driving member, and said driven member being spaced a predetermined distance apart from said driving member;

means for rotating said driving member to thereby effect rotation of said driven member through said coupling spring at a particular torque level that is established by the frictional engagement between said members and said spring;

an annular member concentrically mounted for rotation with said driving member, said annular member having a radially extending slot that is engaged with the ear on said coupling spring and said annular member having an engageable portion extending therefrom;

a ring member concentrically mounted on said driving member in a fixed angular relationship with respect thereto, but slidably movable thereon, and said ring member having a portion extending for engagement with the engageable portion of said annular member;

and solenoid actuated means for moving said ring member into engagement with said annular member so that a direct drive is established between said driving member and said coupling spring, and a torque level is thereby exerted on said driven member which is different from said particular torque level.

References Cited by the Examiner

UNITED STATES PATENTS 2,219,877 10/40 Starkey.
2,487,280 11/49 Starkey.
2,566,539 9/51 Starkey.
2,954,108 9/60 Lenney.

DAVID J. WILLIAMOWSKY, *Primary Examiner.*